United States Patent
Corr et al.

(10) Patent No.: US 10,397,429 B2
(45) Date of Patent: Aug. 27, 2019

(54) PRINTING SOFTWARE SYSTEM WITH DYNAMIC CUSTOMIZATION CAPABILITY

(71) Applicants: KABUSHIKI KAISHA TOSHIBA, Tokyo (JP); TOSHIBA TEC KABUSHIKI KAISHA, Tokyo (JP)

(72) Inventors: Martin E. Corr, Hunters Hill (AU); Ben Lear, Bangor (AU); Lilian Ji, Burwood (AU); Hugh J. Wilcox, Drummoyne (AU)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 4 days.

(21) Appl. No.: 15/486,057

(22) Filed: Apr. 12, 2017

(65) Prior Publication Data
US 2018/0302524 A1    Oct. 18, 2018

(51) Int. Cl.
*G06F 3/12* (2006.01)
*H04N 1/00* (2006.01)

(52) U.S. Cl.
CPC ......... *H04N 1/00938* (2013.01); *G06F 3/123* (2013.01); *G06F 3/1205* (2013.01); *G06F 3/1225* (2013.01); *G06F 3/1236* (2013.01); *G06F 3/1288* (2013.01); *G06F 3/1289* (2013.01); *H04N 1/00244* (2013.01); *H04N 1/00411* (2013.01); *G06F 3/1211* (2013.01); *G06F 3/1275* (2013.01); *H04N 2201/0094* (2013.01)

(58) Field of Classification Search
CPC ............................ H04N 1/00938; G06F 3/123
See application file for complete search history.

(56) References Cited

U.S. PATENT DOCUMENTS

| | | | | |
|---|---|---|---|---|
| 5,963,207 | A * | 10/1999 | Brewer | G06F 3/0482 707/999.007 |
| 2004/0227973 | A1* | 11/2004 | Taylor | G06F 3/1204 358/1.15 |
| 2007/0165258 | A1* | 7/2007 | Farrell | G06F 3/1205 358/1.13 |
| 2007/0245039 | A1* | 10/2007 | Dahneke | G06F 9/4411 710/15 |
| 2007/0297007 | A1* | 12/2007 | Zimmerman | G06F 3/122 358/1.15 |

(Continued)

*Primary Examiner* — King Y Poon
*Assistant Examiner* — Michael Burleson
(74) *Attorney, Agent, or Firm* — Social IP Law Group LLP; Jonathan Pearce; Steven C. Sereboff

(57) ABSTRACT

There are disclosed methods, systems and computer readable medium for a scalable printing software system. The method includes requesting installation of printing software from a printing device to enable a computing device to print using the printing device, receiving printing software from the printing device, and installing the printing software. The method further includes requesting information related to a customized version of the printing software from a customization server unrelated to the printing device, requesting installation of the customized version of the printer software, installing the customized version of the printing software and performing a print operation using the computing device to execute software components from the printing software and from the customized version of the printing software.

17 Claims, 5 Drawing Sheets

(56) References Cited

U.S. PATENT DOCUMENTS

| | | |
|---|---|---|
| 2008/0304096 A1 | 12/2008 | Maglanque |
| 2009/0051960 A1 | 2/2009 | Maglanque et al. |
| 2015/0029547 A1* | 1/2015 | Fukudome ............ G06F 3/1204 |
| | | 358/1.15 |
| 2015/0350473 A1* | 12/2015 | Hirota ................ H04N 1/00962 |
| | | 358/1.13 |

* cited by examiner

PRINTING SOFTWARE SYSTEM WITH DYNAMIC CUSTOMIZATION CAPABILITY

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to printing software and more particularly to a scalable printing software system with dynamic customization capability.

Description of the Related Art

Acquisition of the appropriate printer driver and associated software has been a perennial problem for information technology administrators. In the pre-Internet era, an administrator would be required to maintain a copy of a printer driver and associated software on a physical storage medium and, when new computers were installed or when new printers or multifunction peripherals were added to a network, insert the physical media into the computer and install the appropriate software on each machine. As can be imagined, this process is extremely cumbersome in information technology environments including hundreds or thousands of computers that may print to a new printer or multifunction peripheral.

With the advent of the Internet, acquisition of printer drivers and associated software has become easier. Software can, sometimes, be obtained automatically from the Internet by a computer operating system upon detection of a particular type of printer or multifunction peripheral. Still, under this scenario, the default printing software is obtained from a general purpose library of driver software. In many cases, a particular use case or particular set or subset of network users would like to have customizations to their printing software that enable their computers to perform functions not necessarily suitable or necessary for the average user of a printer or multifunction peripheral. In some cases, these customizations may also be limited to a subset of users even within an organization.

In order to address these shortcomings, operating system developers like Microsoft® have created systems in which a computer operating system may communicate intelligently with a printer or multifunction peripheral directly over a local network in order to obtain a copy of a driver suitable for the printer or the multifunction peripheral and that may or may not be customized for some or all of the users of that network. This has been commonly referred to as the Point and Print functionality because the computer is "pointed" at the printer or MFP and, after the printer or MFP identifies and provides suitable printing software and it is installed, the printer or MFP may be used to print. It is intended as a simple configuration system and has the benefit of requiring no Internet connection or maintenance of individual sets of physical media.

However, after such printing software is installed, information technology administrators often desire to customize software or user interface elements associated with printing (or other MFP) operations. In many cases, these customizations may be to workflows or to automate aspects of the workflows so as to alleviate repetitive tasks or to select automated sets of options. These customizations may be selected by a printer administrator, as opposed to any other administrator. As used herein, "printer administrator" means an individual responsible for the printer or MFP at or at the direction of a particular organization, but not the original manufacturer of the printer or MFP and not operating system designers or administrators associated with any operating system software. Because the "printer administrator" operates for an organization where the MFP or printer is used, he or she is more-closely attuned to the specific needs of the users of the printer or MFP and the associated customizations that may be desired.

Under currently available systems, these customizations may require an information technology administrator or printer administrator to move from computer to computer installing additional software. Otherwise, altering the installed printing software may result in sub-optimal operation of the computer for printing purposes or require user intervention on each print request to enable operation. None of these options for customization of the printing software is particularly appealing and generally are costly in administrator time and effort.

Throughout this description, elements appearing in figures are assigned three-digit reference designators, where the most significant digit is the figure number where the element is introduced. An element that is not described in conjunction with a figure may be presumed to have the same characteristics and function as a previously-described element having the same reference designator.

DETAILED DESCRIPTION

In view of the limitations of printing software in the past, it is desirable to provide a system by which customizations such as altered or simplified workflows, automation, and customized user interfaces for printing software may be provided without the requirement of manually installing new drivers for each member of an organization. It would be beneficial if the printing software or MFP itself could direct computers reliant upon printer drivers to customized printing software and assist in providing and installing customized printer software.

The system described herein enables organizations to customize printing software for newer or preferred customizations. These customizations may be driven by a printer administrator as opposed to an operating system provider or manufacturer of an MFP or computer. Therefore, the organization itself can drive and direct the customizations.

Description of Apparatus

Figure 1:
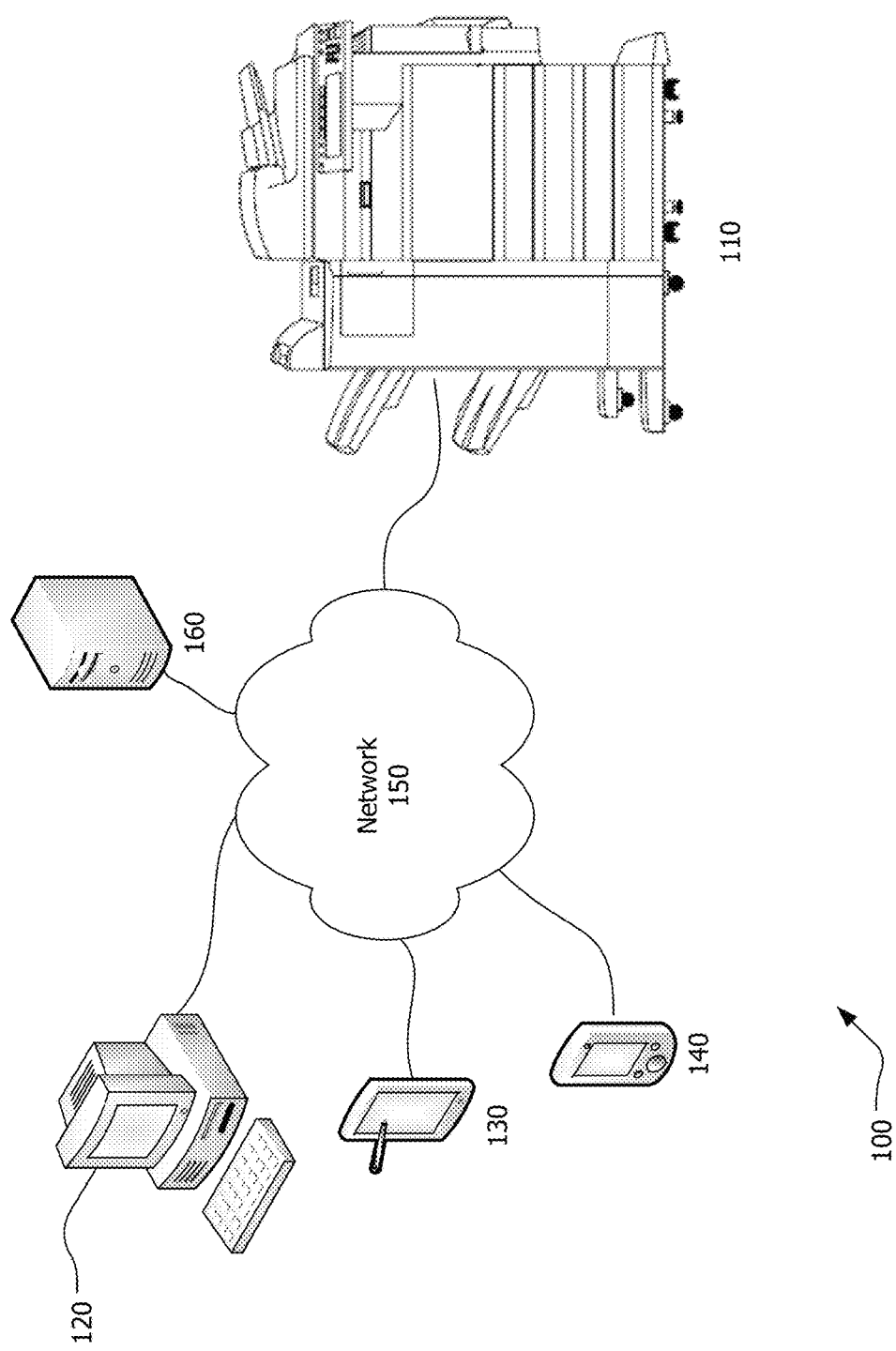
FIG. 1 is a block diagram of a scalable printing software system with dynamic customization capability.

Referring now to FIG. 1, a scalable printing software system 100 with dynamic customization capability is shown. The system 100 may include a multifunction peripheral 110 (or other printing device), a computer 120, a tablet computer 130, and a mobile device 140, such as a smartphone, and a server 160, all connected by a network 150. Although shown as distinct devices, each of the computer 120, tablet computer 130, mobile device 140, and server 160 may be a desktop computer, a portable computer, a laptop computer, a tablet computer, a personal digital assistant, a smart phone, or some other form of computing device capable of performing the functions described herein. In addition, though shown as only a single multifunction peripheral 110, additional and different printing devices may form a part of the system 100.

The multifunction peripheral (MFP) 110 is a type of document processing device which is an integrated device providing at least two document processing functions, such as print, copy, scan and fax. In a document processing function, an input document (electronic or physical) is used to automatically produce a new output document (electronic or physical).

Documents may be physically or logically divided into pages. A physical document is paper or other physical media bearing information which is readable unaided by the typical human eye. An electronic document is any electronic media content (other than a computer program or a system file) that is intended to be used in either an electronic form or as printed output. Electronic documents may consist of a single data file, or an associated collection of data files which together are a unitary whole. Electronic documents will be referred to further herein as documents, unless the context requires some discussion of physical documents which will be referred to by that name specifically.

In printing, the MFP 110 automatically produces a physical document from an electronic document. In copying, the MFP 110 automatically produces a physical document from a physical document. In scanning, the MFP 110 automatically produces an electronic document from a physical document. In faxing, the MFP 110 automatically transmits via fax an electronic document from an input physical document which the MFP 110 has also scanned or from an input electronic document which the MFP 110 has converted to a fax format.

MFPs, like MFP 110, are often incorporated into corporate or other organization's networks, such as network 150, which also include various other workstations, servers and peripherals. MFP 110 may also provide remote document processing services to external or network devices.

MFP discovery is required before any device may utilize an MFP like MFP 110. Discovery typically involves the manual or automated inputting of a network name or an internet protocol (IP) address for the MFP into a suitable device driver or similar application on a device. At that point, the device can configure and, if appropriately configured, utilize the functionality provided by the MFP 110.

Though shown as a multifunction peripheral, MFP 110 may in some cases be a printer only. However, as used herein, unless specifically described otherwise, the words MFP or multifunction peripheral mean a device capable of more than merely printing as described above.

The computer 120 is a computing device as discussed below with reference to FIG. 2. The computer 120 may be a personal computer of a user of the network 150. On a given network 150, there may be numerous computers 120. In a typical organization, every employee or worker may have a computer 120. The computer may communicate with the MFP 110 through the network 150 or, in some cases, may communicate directly with the MFP 110 or through another computer. In other cases, some or all of the network 150 may be or include the Internet such that printing can occur at remote locations.

The computer 120 may require printing software such as or including a printer driver so as to interact with the MFP 110 to thereby print or perform other MFP operations such as scanning, faxing, generating documents for storage in cloud storage and similar operations. The computer 120 may obtain access to printing software through direct installation by an administrator or user, by interacting with a remote server including printer software, or by communicating with the MFP 110 that provides the computer 120 with suitable printer software.

The tablet computer 130 is another computing device (FIG. 2) but is in a different form. Otherwise, the tablet computer 130 is substantially the same as the computer 120. The tablet computer 130 may not require printing software or may interact with the MFP 110 differently such that a raw document is provided to the MFP 110 for conversion and output by the MFP 110 itself. Or, the sources of printing software described above with respect to the computer 120 may also be used by the tablet computer 130. There may be many tablet computers on a given network, even though only one is shown in FIG. 1.

The mobile device 140 is another computing device (FIG. 2) but is in a different form. The mobile device 140 may be a smartphone, wearable computer, augmented reality device, or other device capable of printing. Otherwise, a mobile device may operate in substantially the same manner as a tablet computer 130. As with the tablet computer 130 and the computer 120, there may be many of these mobile devices on a given network, even though only one is shown in FIG. 1.

The server 160 is a computing device (FIG. 2), but is primarily responsible for enabling updates to the printing software as described herein. The server 160 is shown as a part of the network 150 including the computer 120, but may be remote from the computer 120 connected to the network by the Internet. In some cases, the MFP 110 itself may be a server 160 as well. But, preferably, the server 160 operates distinctly from any of the other devices connected to the network.

The network 150 interconnects the various other components. The network 150 may be or include the Internet. The network 150 may be a local network such as a LAN or a wide area network (WAN) and may be wired or wireless or partially wired and partially wireless. Authentication may be required to access some or all of the network 150.

Figure 2:
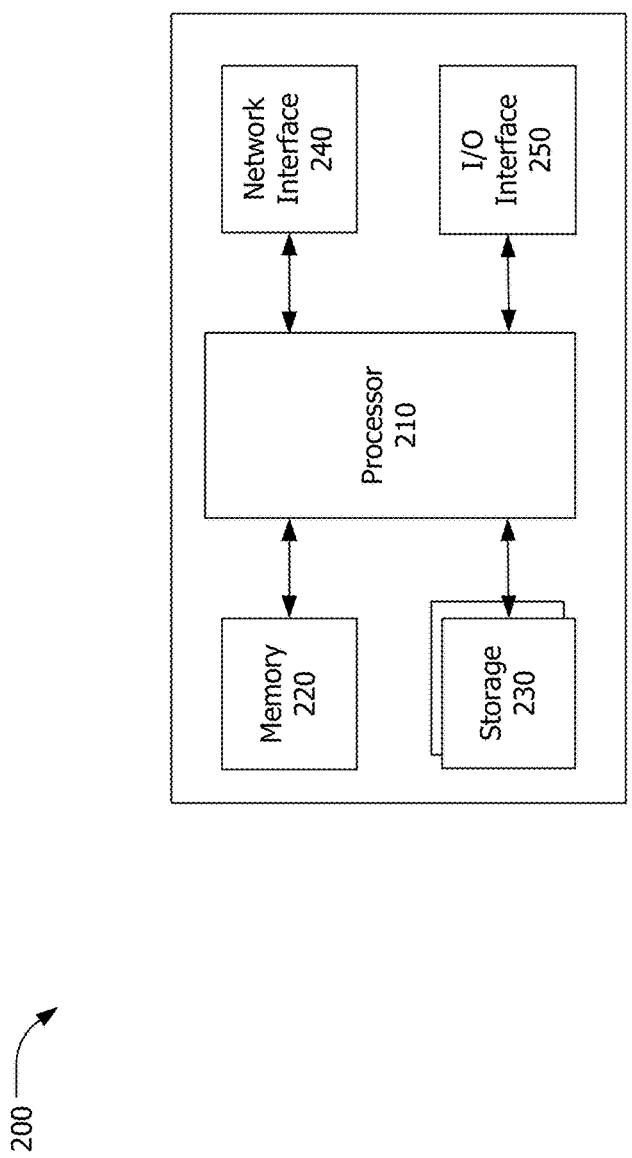
FIG. 2 is a block diagram of a computing device.

Turning now to FIG. 2, a computing device 200 is shown. The computing device 200 may be representative of the computing devices such as the computer 120, the tablet computer 130, and the mobile device 140 and other computing devices discussed herein. The computing device 200 may include a processor 210 coupled to a memory 220, storage 230, a network interface 240, and an I/O interface 250. The processor 210 may be or include one or more processes such as microprocessors, graphic processors, co-processors, digital signal processors, and other processors.

The memory 220 may be or include RAM, ROM, DRAM, SRAM and MRAM, and may include firmware, such as static data or fixed instructions, BIOS, system functions, configuration data, and other routines used during the operation of the computing device 200 and processor 210. The memory 220 also provides a storage area for data and instructions associated with applications and data handled by the processor 210.

The storage 230 may provide non-volatile, bulk or long term storage of data or instructions in the computing device 200. The storage 230 may take the form of a disk, tape, CD, DVD, or other reasonably high capacity addressable or serial storage medium. In this document, the term "storage medium" means a physical device or object for storing data and does not include transitory media such as signals or waveforms. Multiple storage devices may be provided or available to the computing device 200. Some of these storage devices may be external to the computing device 200, such as network storage or cloud-based storage.

The network interface 240 may be configured to interface to a network such as a local area network, a wide area network, and/or the Internet.

The I/O interface 250 may be configured to interface the processor 210 to peripherals (not shown) such as displays, keyboards and USB devices.

The computing device 200 may include software, firmware, and/or hardware for providing functionality and features described herein. The computing device 200 may therefore include one or more of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs). The hardware and firmware components of the client computing device 200 may include various specialized units, circuits, software and interfaces for providing the functionality and features described herein. The processes, functionality and features may be embodied in whole or in part in software which operates on a client computer and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some components are performed by the processor 210 and others by other devices.

Figure 3:
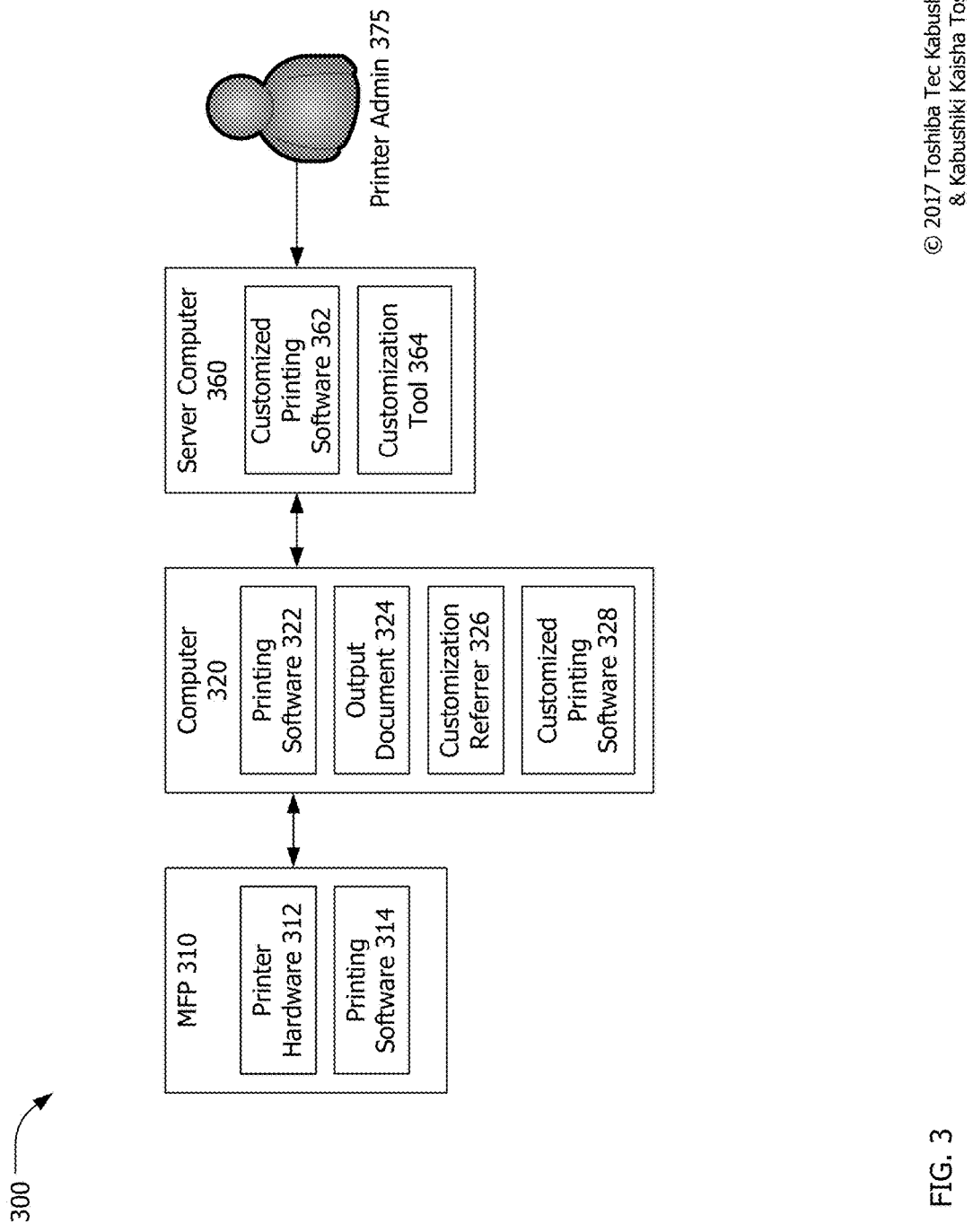
FIG. 3 is a functional block diagram of a scalable printing software system with dynamic customization capability of FIG. 1.

FIG. 3 is a functional block diagram of a scalable printing software system 300 with dynamic customization capability of FIG. 1. The system 300 includes the same MFP 310, computer 320 and server computer 360 of FIG. 1. In addition, FIG. 3 includes an individual, a printer administrator 375, as discussed above. Here, each includes relevant function components.

The MFP 310 includes printer hardware 312 and printing software 314. The printer hardware 312 is the hardware responsible for performing printing operations. An MFP 310 may include other hardware such as scanning hardware and facsimile hardware and similar systems may be used to update software associated with those functions. The printer hardware, as discussed herein includes all network adaptors, processors, and other equipment necessary to receive a print request from a computer, such as computer 320, and to thereafter complete the print operation. The printer hardware 312 may also include software sufficient to enable print jobs to be operated upon and completed by the MFP.

The printing software 314 as used herein means specific printing software including a print driver and associated software such as user interface elements, dynamic linked libraries, executable files, and similar files that may provide interactivity, once installed, with a user so as to request or to formulate a print request after it is input by a user of a computer. The printing software 314 here is printing software installed on the MFP 310 so as to enable the MFP 310 to provide that software to a requesting computer 320 so that the requesting computer 320 may request print jobs to be performed by the MFP 310.

This printing software 314 may, in whole or in part, be pre-submitted to an operating system company or to a manufacturer of the MFP 310 for approval and to confirm that it does not incorporate any malicious software. Thereafter, the MFP 310 may be sold or shipped with this printing software 314 installed. Alternatively, the MFP 310 may periodically access a remote server operated by an operating system company or an MFP 310 manufacturer to check for and obtain customized printing software 314.

The computer 320 includes printing software 322, an output document 324, a customization referrer 326, and customized printing software 328. The printing software 322 may be the same as the printing software 314 once the customized printing software 328 has been installed on the computer 320. This may cause some transformation to the printing software 322 as it is installed, but it may be obtained from the printing software 314, when requested, from the MFP 310. This may take place as a part of a point and print (PnP) installation process or may take place even if the printing software 322 is downloaded directly from an internet site or installed manually by a printer administrator.

The output document 324 may be a document that is being prepared for printing by the MFP 310. This may be a Microsoft® Word® document, an image, a portable document format (PDF) document or any other type of document with human-readable characteristics that may be output using a printer.

The customization referrer 326 is software that enables the printing software 322 to be updated, if directed by the server computer 360, to incorporate new functionality, workflows, user interface elements, and similar capabilities. The customization referrer 326 may be activated manually by a user or printer administrator for the computer 320 and/or MFP 310 through interaction with the printing software 322 itself. Alternatively, the customization referrer 326 may be programmed to periodically access the server 360 to check for customized printer software. Still further alternatively, the printing software 322 may be programmed to respond to particular operations by a user such as certain keystrokes (e.g. Ctrl+P), or the activation of user interface buttons (e.g. the Print button or a "Customize" button) to thereby trigger a search for customized printer software. The search location may be fixed (e.g. an internet address or LAN address) or may be dynamic (e.g. reliant upon DNS or some other lookup system to derive). The customization referrer 326 functionality will be discussed more fully below.

The customized printing software 328 is customized printing software that has been altered by a printer administrator, like printer administrator 375, to incorporate new or altered functionality. This may be particularly useful, as discussed above, to enable new functions, or organization-specific functions that are not relevant for a general set of printer software.

For example, an organization (e.g. a hospital) may need to perform many similar print operations (for example, printing out a specific set of charts for each patient). A nurse or other intake specialist may be required to activate several print dialogues and search in several different shared or network folders or databases for relevant data to be printed. A great deal of time and effort may be saved by automating that process. However, alterations to the underlying print driver may not actually be necessary. So, merely updating the printing software 328 without reliance upon manual updates, a more general customization available somewhere on the internet, may be helpful in dramatically reducing workload. In response, a customized printing software 328 provided by a printer admin 375 at a known location and printing software 322 that is designed to periodically or upon certain triggers check that location may help.

It should be noted that this customized printing software 328 is shown separate from the printing software 322 because the customized printing software 328 is preferably maintained in its own directory or file structure, separate from the original printing software 322. The customized printing software 328 (and indeed the printing software 322) may be designed in such a way that it first looks to the directory known to include customized printing software 328 for each necessary file (e.g. executables, DLLs, configuration files, user interface settings, etc.) before then looking to the printing software 322 directory. In this way, for each aspect of the printing software 322 that is loaded, if a customized version may be found in the directory for the customized printing software 328, that customized version may be loaded in place of the original printing software version 322 without disturbing the security of the original printing software 322 at all.

The location of the customized printing software 328 may even be dynamic such that as subsequent updates are added, dynamic links to the customized locations may be stored such that there is a cascading listing of directory locations which take precedence over the original printing software 322 without disturbing it, and together act as the customized printing software 328. Ideally, there would be a single location or directory containing only the most recent customized printing software 328.

The customized printing software 328 may incorporate new workflows such as new processes undertaken or available for the MFP 310 in a user interface used by a user of the computer 320 to generate an output document 324. For example, in the case of the hospital worker above, the identification and selection of several documents or data from several sources may be automated into a single user interface for selection or automatic identification. This will reduce the amount of time and work required for the hospital worker. Though, the underlying print driver may or may not require any changes or updates to accomplish this task, in the past it may have required a completely new customized driver. A printer administrator 375, associated with the hospital, may make changes to the customized printing software 328 that are then detected and installed and that may enable much more simplified workflows for a given user, like the hospital worker.

The customized printing software 328 may simply alter the user interface while having no effect on the underlying print operation itself. For example, a particular user or set of users may only ever need to print from a particular directory or set of documents and only in black and white. A customized printing software 328 created by a printer admin 375 for those users may significantly simplify the user interface presented to a particular user or set of users such that only those operations (e.g. black and white from a particular directory) are available to that user or set of users. Again, this aids in and simplifies workflows, but may not substantively alter the operational aspects of the MFP 310 or the printing software 322.

The server computer 360 includes customized printing software 362 and a customization tool 364 for use by the printer admin 375. The customized printing software 362 is software created by the printer admin 375 that includes different or new workflows, automation, simplification, or user interface elements. The customized printing software 362 may be flagged as "new" using flagging techniques such as version numbers (e.g. version 1.1 is newer than version 1.0) or based upon the date of their respective creation or last revision.

The customized printing software 362 may be created on or uploaded to the server computer 360. The server computer 360 may act as the location to which the customization referrer 326 refers and checks for customized printing software 362. Though shown as a server computer 360, the server computer 360 may be a part of an MFP, potentially including the MFP 310. It may be preferable for the sever computer 360 and MFP 310 to be separate and distinct from one another, but they need not be.

The customized printing software 362 may be a set of executable files and libraries that, when used, perform printing or other multifunction peripheral operations. The customized printing software 362 may include updates to all of the executable files and libraries and configuration files or only a subset of those files and libraries and configuration files. For example, files may be individually identified on the server computer 360 by version numbers such that when the computer 320 accesses the server computer 360 through the customization referrer 326, only those files that are "newer" than the ones installed as the printing software 322 on the computer 320 are downloaded and updated.

The relative "newness" of a particular executable or library or configuration file may be based upon creation date for the file, last edit date, or a specific version number embedded in the file itself or in a database associated with the file or files. The customization referrer 326 may periodically or, upon a prompt or specific user action, look to the customized printing software 362 to determine if one or more files is "new" and, if so, download it and customization the customized printing software 328 on the computer 320.

The customization tool 364 is a set of software suitable to create customized printing software 362. This too may be provided to print administrators like print admin 375 as a part of a set of printing software such as the printing software 314 provided with any MFP 310. Or, this customization tool 364 may be downloaded from the internet or obtained by other means. The customization tool 364 is designed in such a way that it may operate upon the printing software 314 to enable customization. The customization tool 364 may be so rudimentary as to be or rely upon source code to enable alterations to the printing software 314 to create customized printing software 362 or may be a so-called "wizard" with drag-and-drop capabilities so as to dramatically simplify the process of creating customized printing software 362.

As discussed above, the customization tool 364 may enable the customized printing software 362 to include new workflows, automation, simplification, or user interface enhancements or changes. The customization tool 364 may operate as a web-based software from the server to which a printer administrator, like print admin 375, authenticates. Or, the customization tool 364 may be downloaded to a computing device and connect with the server computer 360 once the printer admin 375 has created customized printing software 362 so as to upload the customized printing software 362 to the server computer 360.

The customization tool 364 may incorporate a "wizard"-like interface to enable a printer admin 375 to alter the graphical user interface of the customized printing software 362 or may enable free-form alterations to graphical user interface elements, workflows, or automation for the customized printing software 362. The customization tool 364 may allow a printer admin 375 to substantially reduce the user interface options available in the customized printing software 362 relative to that provided in the default printing software 314. This may streamline the customized printing software 362 for specific purposes.

The customization tool 364 may include the capability to generate automation or automatic workflows by the printer admin 375. For example, if a printer admin 375 notices that his or her staff consistently perform a series of actions for a given set of documents, then the printer admin 375 may use the customization tool 364 to generate customized printing software 362 that incorporates a simplified or single-click access to that series of actions. The prompts, if any, to a user may be customized so as to simplify the series of actions.

For example, a particular set of employees at an organization may consistently accesses a remote server, searches through a folder for a particular file, perhaps incremented in name or date from the last file found, then downloads that file, and requests printing of page three of that file, then saves page three, alone to a new server and folder. A printer administrator, like printer admin 375, may take note of that consistent set of steps and use the customization tool 364 to create an associated customized printing software 362 that incorporates and dramatically simplifies that process. Specifically, the printer admin 375 may design the customized printing software 362 in such a way that the remote server is accessed, the next-most-recent file is identified automatically, page three is printed and then saved to a new server location. The customized printing software 362 may merely require the user to identify the associated remote server (and perform any login operation required) once at the start of the operation. Thereafter, the process may take place a set number of times or the customized printing software 362 may ask the user to input the number of times that this process is to take place. The customized printing software 362 may perform the process iteratively until it has been performed for every file stored in the identified folder on the remote server.

The customization tool 364 is flexible to enable various types of changes and updates to be made to the customized printing software 362 to enable virtually any type of workflow that would be beneficial to an organization.

Description of Processes

Figure 4:
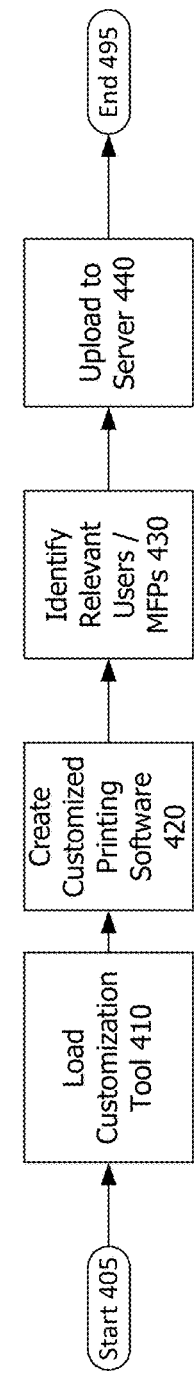
FIG. 4 is a flow chart of a process for printing software customization.

Referring now to FIG. 4, a flow chart of a process for printing software customization. The process has a start at 405 and an end at 495, but the process may take place many times over any length of time and for any group of users. For example, the printer admin 375 may create customized printing software 362 for only a subset of users and may, immediately, begin the process again to create customized printing software 362 for a different subset of users.

First, after the process starts at 405, the customization tool is loaded at 410. This may be the customization tool 364 from FIG. 3. As discussed briefly above, the customization tool may operate in a web-based fashion (e.g. through a browser) or in a client/server model from a printer administrator's computer while in communication with a server computer 360 (FIG. 3). Alternatively, the customization tool may reside as software on a printer administrator's computer alone as a stand-alone tool for use in creating customized printer software. Appropriate authentication credentials may be required in order to access the customization tool at 410. Regardless, the printer administrator begins the process of creating customized printing software by loading the customization tool 410.

Once the tool is loaded, then the printer administrator may use the tool to create customized printing software at 420. This process may involve drag-and-dropping user interface elements into a modified version of the printing software or may be so detailed as to involve alterations to the underlying source code or scripting code that is used to create the printer software. Preferably, both options are available to the printer administrator for total flexibility. Still further alternatively, a printer administrator may be given access to a database of third-party created customized printing software that may be loaded in place of a particular set of printing software and either accepted as is or modified further to suit the needs of the organization or printer administrator.

The creation process may involve adding further options to a user interface, enabling specific macro functions, enabling automation for some or all of a print or other multifunction peripheral operation, removing functionality that the printer administrator does not wish users to access, or otherwise altering the printer software.

Once the customized printing software is created at 420, then the users, computers or MFPs to whom or which the customization applies are identified at 430. This step may not take place in less-complex environments, but in organizational environments in which there are hundreds or thousands of users and printers available, then only a subset may be designated to receive the customized printer software. For example, all users in a particular group (e.g. nurses or receptionists) may be flagged to receive the customized printer software. Alternatively, only a subset of MFPs may be flagged for receipt of the customized printer software. In this way, those MFPs may have automation or limited user interfaces such that they are better-suited for a particular type of operation or series of actions.

Finally, the customized printing software is uploaded to the server at 440. In cases in which the customization tool operates on the server itself (e.g. through a web-based application), this process may be complete once the customized printing software has been created and saved. However, in cases in which the customization tool operates on a computer of a printer administrator, on an MFP itself, or on another external device; the customized printing software may be uploaded to the server at 440.

In some cases, the MFP itself may serve as a "server" for the customized printer software. An MFP may store customized printing software for itself or for a number of different MFPs and users simultaneously. In these cases, the customized printing software is uploaded to the MFP acting as a server at 440. This customized software does not replace the default or original printing software that is stored on the MFP. Instead, this customized printing software is stored separately and provided to computers only upon request.

Once the software is uploaded, the process may end at 495.

Figure 5:
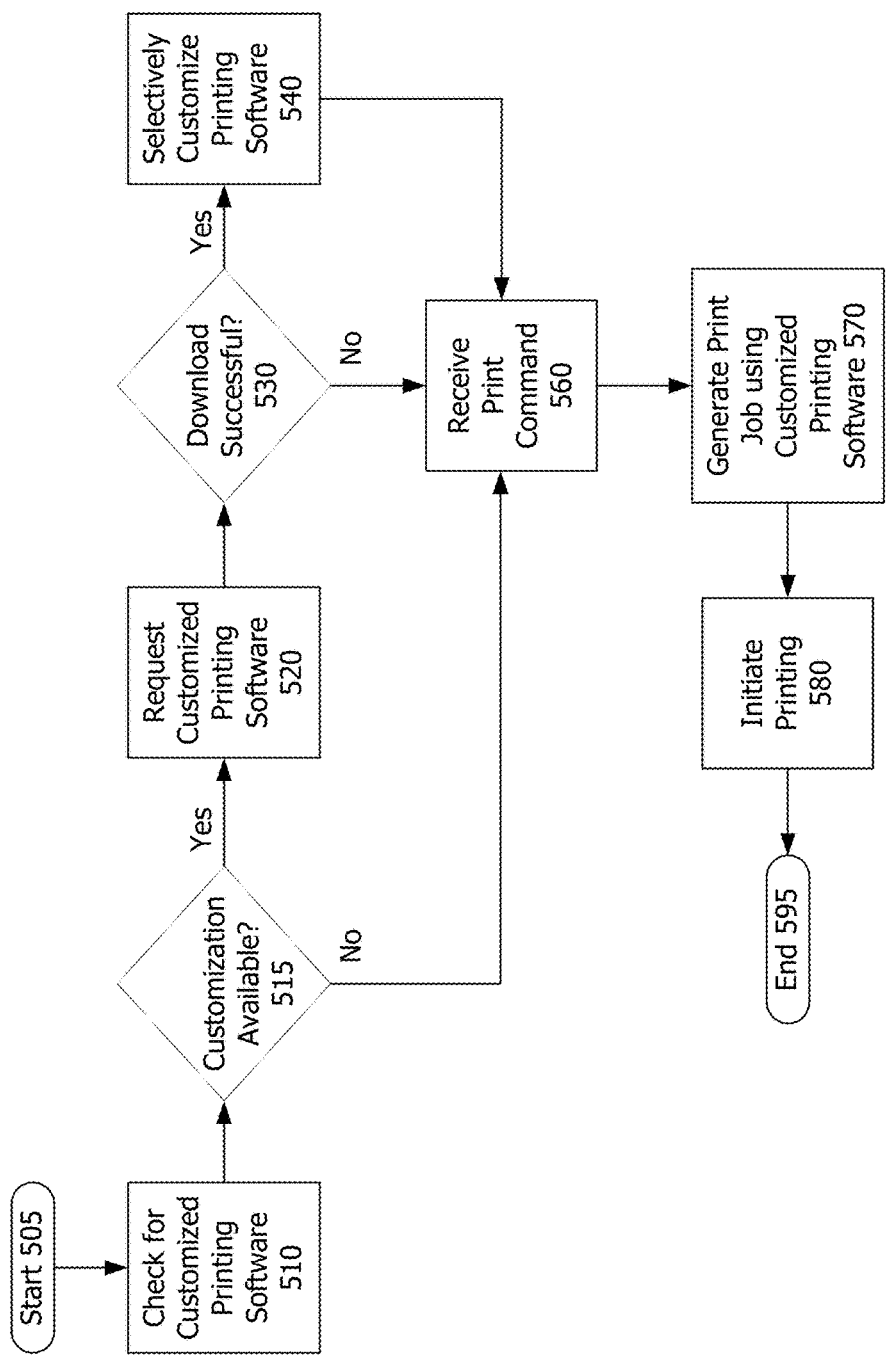
FIG. 5 is a flow chart of a process for printing using a scalable printing software system with dynamic customization capability.

Turning to FIG. 5, a flow chart of a process for printing using a scalable printing software system with dynamic customization capability is shown. The process is shown with a start 505 and an end 595. However, the process may take place many times for a given computer using printer software.

After the start 505, the process begins with a check for customized printing software 510. This process may take place automatically when the original printing software is opened as a user prepares to print using a given MFP or printer. This may, in part, be based upon a particular user. For example, as a part of the check, information pertaining to the particular user such as an IP address, username, or group affiliation may be transmitted along with the check so that the responding server can respond with customized printing software for a particular user or group. Other users for whom the customization is not useful or not relevant may not find any customization available.

This check for customized printing software at 510 may be triggered by simply launching the printing software for a particular MFP or printer or may be triggered by specific actions. The specific actions may include clicking on a manual customization button within the printing software or clicking on a "print" button within the printer software. The specific action may be triggered by any number of interactions.

Furthermore, the check for customized printing software at 510 may be pre-programmed to check a particular server location or that location may be customized at the time of the first installation of the printing software or may be customized from time to time by a printer administrator. Still further alternatively, the server location may itself be a referrer (e.g. a domain name resolvable by an external domain name server) to another location that is, itself, dynamic. In this way or using similar mechanisms, the location may be changed for all MFPs and all printing software to which the location refers merely be updating the referrer location (e.g. the IP address to which the domain name refers). This is much simpler than updating hundreds of computers and may be undertaken by a printer administrator externally from each of the individual printer software's installed on various computers throughout an organization.

Next, the printing software determines whether or not a customization is available at 515. This is the process by which the printing software automatically requests access to the location identified as the associated server to check whether or not there is customized printer software. If no customization is available ("no") at 515, then the process proceeds to receive a print command at 560 (discussed below).

However, if there is a customization available ("yes" at 515), then the customization is requested from the server at 520. This customization request begins the process of downloading the customized printer software. This customization may be all of the printing software files or may only be a subset of the files, for example some configuration settings, a user interface file, or some libraries. The server receives that request and, assuming the computer is authorized to access to the update, the server may provide that customization (not shown).

Next, the printing software determines whether or not a downloading the customized printer software has finished successfully. For example, when a failure occurs in the network 150, the computer can't receive the customized printer software. In this process, the printing software can determine based on whether the downloading time has been longer than a predetermined time. If the downloading can't be completed ("no") at 530, then the process proceeds to receive a print command at 560 (discussed below). At the same time, the printing software may go back to process at 510 or 520 to retry in parallel with the process at 560. This retrying process can be executed in a background process.

On the other hand, if the printing software can download the customized printer software successfully ("yes") at 530, then the process proceeds to customize the printing software at 540 (discussed below).

As discussed above, this may be an entire set of printing software or only a subset of the printing software that has been updated. The customized printing software may be stored in a temporary location until it is installed.

Next, the printing software is selectively customized at 540. In this step, the customized printing software is installed. The customized printing software is installed in a separate location so as to not overwrite the original printer software. This does not break the original printer software. As discussed above, print operations may first look to the customized printing software location, then to the original printing software location when launching the printing software.

After the software is customized at 540 (as discussed above, this may happen many times over the course of the use of the printer software), a print command may be received at 560. This step also follows a determination that there is no customized printing software available at 515 ("no" at 515). The print command may be input by user interaction as simple as "Ctrl+P" or may be initiated by interaction with the customized printing software through multiple menus and settings selectors to a final "print" dialogue that causes the customized print driver to begin operating on the print job.

Once the print command is received at 560, then a print job is generated using the customized printing software at 570. As discussed above, the customized printing software files will be utilized with preference over the original printing software files. In some cases, the customized printing software may wholly replace the original printer software. In other cases, the underlying substantive portions of the printing software may remain indefinitely, with only user interface changes being made to add or eliminate or otherwise streamline elements of the customized printing software for the individual's purposes. The end result of the generation of the print job using the customized printing software at 570 is a print job that may be transmitted to a printer for output.

Finally, printing may be initiated by the printer or other MFP at 580. The process may then end at 595.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A printing software customization system comprising:
a computing device including:
a processor;
a memory coupled to the processor, the memory storing program instructions that, when executed, cause the computer to perform actions, comprising:
requesting installation of printing software from a printing device to enable the computing device to print using the printing device;
receiving the printing software from the printing device;
installing the printing software;
requesting information related to a customized version of the printing software from a customization server, distinct from the printing device, operated by a printer administrator, the customized version of the printing software incorporating at least one customized element specifically designed by the printer administrator for the organization by whom the printing device is used;
requesting installation of the customized version of the printing software;
installing the customized version of the printing software without disturbing the printing software;
performing a print operation to execute software components from both the printing software and from the customized version of the printing software; and
wherein at least a portion of the customized version of the printing software is installed in a secondary installation folder rather than a primary installation folder for the printing software and further wherein the printing software operates first upon software components in the secondary installation folder before operating upon software components in the primary installation folder.

2. The system of claim 1 further comprising the printing device including the capability to install printing software upon the computing device upon receipt of a request from the computing device requesting a print operation be performed by the printing device.

3. The system of claim 1 wherein the customization server is designated by the printer administrator for the printer.

4. The system of claim 1 wherein the customized version of the printing software includes at least one of user interface elements, additional printing workflows, and print task automation that were unavailable in the printer software.

5. The system of claim 4 wherein the user interface elements, additional printing workflows, and print task automation are designed and created by a printer administrator for the printer.

6. The system of claim 1 wherein the printing software operates first upon software components in the secondary installation folder before operating upon software components in the primary installation folder for each software component referenced by the printer software in a manner does not change the printing software in the primary installation folder.

7. The system of claim 1 wherein the requesting information related to the customized version of the printing software is triggered by at least one of requesting a print operation and completing a print operation.

8. A method for installing and updating printer software, comprising:
requesting installation of printing software from a printing device to enable a computing device to print using the printing device;
receiving the printing software from the printing device;
installing the printing software;
requesting information related to a customized version of the printing software from a customization server, distinct from the printing device, operated by a printer administrator, the customized version of the printing software incorporating at least one customized element specifically designed by the printer administrator for the organization by whom the printing device is used;
requesting installation of the customized version of the printer software;
installing the customized version of the printer software without disturbing the printing software;
performing a print operation by executing software components from the printing software and from the customized version of the printing software; and
wherein at least a portion of the customized version of the printing software is installed in a secondary installation folder rather than a primary installation folder for the printing software and further wherein the printing software operates first upon software components in the secondary installation folder before operating upon software components in the primary installation folder.

9. The method of claim 8 further comprising the printing device installing printing software upon the computing device upon receipt of a request from the computing device requesting a print operation be performed by the printing device.

10. The method of claim 8 wherein the customization server is designated by the printer administrator for the printer.

11. The method of claim 8 wherein the customized version of the printing software includes at least one of user interface elements, additional printing workflows, and print task automation that were unavailable in the printer software.

12. The method of claim 11 wherein the user interface elements, additional printing workflows, and print task automation are designed and created by a printer administrator for the printer.

13. The method of claim 8 wherein the printing software operates first upon software components in the secondary installation folder before operating upon software components in the primary installation folder for each software component referenced by the printer software in a manner that does not change the printing software in the primary installation folder.

14. The method of claim 8 wherein the requesting information related to the customized version of the printing software is triggered by at least one of requesting a print operation and completing a print operation.

15. A computer-readable storage medium storing instructions that, when executed by a computing device, cause the computing device to perform actions comprising:
requesting installation of printing software from a printing device to enable a computing device to print using the printing device;
receiving the printing software from the printing device;

installing the printing software;

requesting information related to a customized version of the printing software from a customization server, distinct from the printing device, operated by a printer administrator, the customized version of the printing software incorporating at least one customized element specifically designed by the printer administrator for the organization by whom the printing device is used;

requesting installation of the customized version of the printer software;

installing the customized version of the printer software without disturbing the printing software;

performing a print operation by executing software components from the printing software and from the customized version of the printing software; and wherein at least a portion of the customized version of the printing software is installed in a secondary installation folder rather than a primary installation folder for the printing software and further wherein the printing software operates first upon software components in the secondary installation folder before operating upon software components in the primary installation folder.

16. The computer readable medium of claim 15 wherein the customization server is designated by the printer administrator for the printer.

17. The computer readable medium of claim 15 wherein the customized version of the printing software includes at least one of user interface elements, additional printing workflows, and print task automation that were unavailable in the printing software which are designed and created by a printer administrator for the printer.

* * * * *